United States Patent
Kurobe et al.

(10) Patent No.: US 10,173,563 B2
(45) Date of Patent: Jan. 8, 2019

(54) SEAT HAVING SURFACE COVER AND PERIPHERAL COVER WITH COOPERATIVE INCLINED PILES

(71) Applicants: TACHI-S CO., LTD., Akishima-shi, Tokyo (JP); HONDA MOTOR CO., LTD., Minato-ku, Tokyo (JP)

(72) Inventors: Ryo Kurobe, Tokyo (JP); Taku Nagasawa, Saitama (JP); Tomoyuki Uemura, Saitama (JP); Kazuyuki Kaneko, Saitama (JP)

(73) Assignees: TAICHI-S CO., LTD., Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/523,372

(22) PCT Filed: Nov. 24, 2015

(86) PCT No.: PCT/JP2015/082843
§ 371 (c)(1),
(2) Date: Apr. 29, 2017

(87) PCT Pub. No.: WO2016/084766
PCT Pub. Date: Jun. 2, 2016

(65) Prior Publication Data
US 2017/0253158 A1  Sep. 7, 2017

(30) Foreign Application Priority Data
Nov. 26, 2014  (JP) ................................ 2014-239357

(51) Int. Cl.
*B60N 2/60* (2006.01)
*B60N 2/58* (2006.01)
(Continued)

(52) U.S. Cl.
CPC ......... *B60N 2/6027* (2013.01); *B60N 2/5825* (2013.01); *B60N 2/5833* (2013.01);
(Continued)

(58) Field of Classification Search
CPC .. B60N 2/7005; B60N 2/5833; B60N 2/6036; B60N 2/6027; B60N 2/5825; B61D 33/0035
(Continued)

(56) References Cited

U.S. PATENT DOCUMENTS 4,784,890 A * 11/1988 Black ................. A44B 18/0076
24/306
7,488,036 B2 * 2/2009 Tache ..................... A47C 31/00
297/219.1

FOREIGN PATENT DOCUMENTS

FR  1593125 A * 5/1970 ............. A47C 7/386
JP  H04-39747 Y2   9/1992

OTHER PUBLICATIONS

International Search Report from International Patent Application No. PCT/JP2015/082843, dated Feb. 23, 2016.

* cited by examiner

*Primary Examiner* — Milton Nelson, Jr.
(74) *Attorney, Agent, or Firm* — Shapiro, Gabor and Rosenberger, PLLC

(57) ABSTRACT

The purpose of the present invention is to provide a seat that makes it possible to easily connect the end of a surface cover when assembling the surface cover and to achieve a secure connection. To this end, a seat (1) is provided with inclined piles (70, 80) on the end of the surface cover (4) and at a location that faces the end of the surface cover (4) on a cushion member (2) that forms a seat section, the inclined pile (80) of the cushion member (2) is inclined in a direction that is the opposite of the direction in which a load resulting (Continued)

from a seated person occurs, and the inclined pile (70) of the end of the surface cover (4) is inclined in the direction in which the load resulting from a seated person occurs.

4 Claims, 5 Drawing Sheets

(51) Int. Cl.
 *B60N 2/70* (2006.01)
 *B61D 33/00* (2006.01)
(52) U.S. Cl.
 CPC ......... *B60N 2/6036* (2013.01); *B60N 2/7005* (2013.01); *B61D 33/0035* (2013.01)
(58) Field of Classification Search
 USPC ................ 297/218.1, DIG. 6, 218.2; 24/442
 See application file for complete search history.

SEAT HAVING SURFACE COVER AND PERIPHERAL COVER WITH COOPERATIVE INCLINED PILES

TECHNICAL FIELD

The present invention relates to a seat which allows a surface cover to be detachably attached to a peripheral cover.

BACKGROUND ART

Japanese Examined Utility Model Application Publication No. 4-39747 (Patent Literature 1) relates to the above-described technical field. The seat disclosed in the publication includes a foamed cushion member molded into a seat shape, a bag-like covering body fixed to the cushion member side so as to be covered, a first cover for covering the front surface side of the covering body, a second cover for covering the rear side of the covering body, and a slide fastener for connecting the first and the second covers. The sense of foreign matter felt by the seated occupant may be eliminated by disposing the slide fastener onto the side surface of the seat back.

CITATION LIST

Patent Literature

PTL 1: Japanese Examined Utility Model Application Publication No. 4-39747

SUMMARY OF INVENTION

Technical Problem

The rear end of the surface cover for covering the seat cushion constituting the disclosed seat, and the lower end of the surface cover for covering the seat back constituting the seat are located at a joint part between the seat back and the seat cushion. The seat back is reclined to connect the surface cover and the peripheral cover at the joint part, thus requiring much labor.

It is an object of the present invention to provide a seat which allows easy and firm connection of the end of the surface cover.

Solution to Problem

The present invention provides the seat having a surface cover and a peripheral cover of a seat section connected via a detachable first fastening part. Inclined piles are disposed on an end of the surface cover, and a part of a cushion member for forming the seat section, facing the end of the surface cover. The inclined pile of the cushion member is inclined in a direction opposite a direction of a load applied by a seated occupant, and the inclined pile on the end of the surface cover is inclined in the direction of the load applied by the seated occupant so that the inclined pile of the surface cover is engaged with the inclined pile of the cushion member.

The seat includes the inclined pile of the surface cover, which inclines in the direction of the load applied by the seated occupant. Upon insertion of the end of the surface cover into the part which faces the end of the surface cover of the cushion member which constitutes the seat section, the end of the surface cover may be engaged with the part facing the end of the surface cover of the cushion member which constitutes the seat section through easy insertion. Thereafter, in spite of the load to the surface cover applied by the seated occupant, the inclined pile of the surface cover is not disengaged from the inclined pile disposed at the location facing the end of the surface cover of the cushion member that constitutes the seat section because the inclined pile of the cushion member is inclined in the direction opposite the direction of the load applied by the seated occupant.

Preferably, the seat section constitutes a seat cushion. The surface cover and the peripheral cover are detachably connected on left, right, and front surfaces of the seat cushion via the first fastening part. The inclined piles are engageably disposed on a rear end of the surface cover, and the cushion member that constitutes the seat cushion, respectively. Preferably, the seat section constitutes a seat back. The surface cover and the peripheral cover are detachably connected on left, right, and upper surfaces of the seat back via the first fastening part. The inclined piles are engageably disposed on a lower end of the surface cover, and the cushion member that constitutes the seat back, respectively.

A holding piece is attached to the end of the surface cover. The inclined pile is formed on the holding piece. The inclined pile of the surface cover is engaged with the inclined pile of the cushion member. In the state that the inclined pile is formed on the holding piece, the holding piece of the end of the surface cover is inserted to allow engagement between the end of the surface cover and the part facing the end of the surface cover of the cushion member that constitutes the seat section. Especially in the case of the surface cover of the seat cushion, the holding piece serves to strengthen the engagement state by its own weight. As a result, the surface cover is hardly disengaged from the cushion member in spite of the load applied by the seated occupant.

Advantageous Effects of Invention

The present invention allows easy and firm connection of the end of the surface cover in assembling thereof.

DESCRIPTION OF EMBODIMENT

Figure 1:
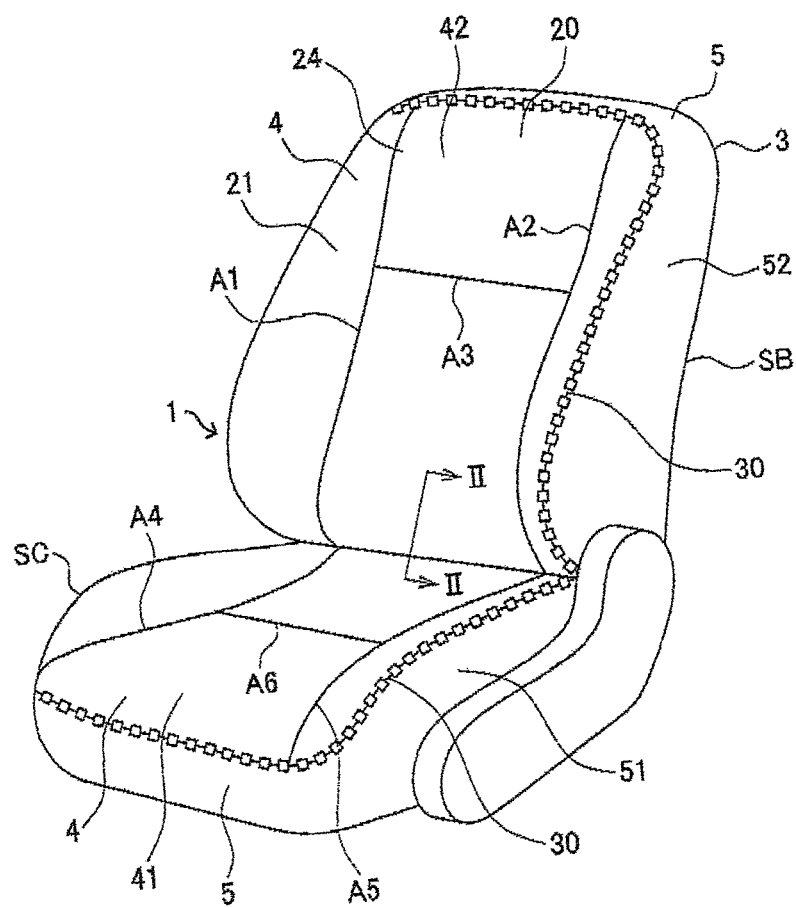
FIG. 1 is a perspective view showing a first embodiment of a seat according to the present invention.

A preferred embodiment of the seat according to the present invention will be described referring to the drawings.

As FIG. 1 shows, a vehicle seat 1 includes a seat cushion (seat section) SC which is movable back and forth on the floor panel, and a seat back (seat section) SB which is reclinable relative to the seat cushion SC. Each of the seat cushion SC and the seat back SB is foiled by covering the surface of cushion member 2 made of a foaming body with a skin 3. The skin 3 includes a surface cover 4 and a peripheral cover 5. The surface cover 4 and the peripheral cover 5 are separately formed to cover the respective cushion members 2 of the seat cushion SC and the seat back SB.

The surface cover 4 includes a cushion surface cover 41 for covering the cushion member 2 of the seat cushion SC, and a back surface cover 42 for covering the cushion member 2 of the seat back SB. The peripheral cover 5 includes a cushion peripheral cover 51 for covering the cushion member 2 of the seat cushion SC, and a back peripheral cover 52 for covering the cushion member 2 of the seat back SB.

Linear pulling-over parts A1 to A6 are formed on the seat cushion SC and the seat back SB of the seat 1. The pulling-over parts A1 to A6 form the outer appearance of the seat 1, and prevent slack and slippage of the skin 3.

The pulling-over parts A1, A2 of the seat back SB include second fastening parts 60 for detachably connecting the cushion member 2 and the back surface cover 42. The detachable second fastening part 60 includes a third fastener half part 61 fixed to the cushion member 2 in a recess 6, longitudinally extending along the pulling-over part A1 on the cushion member 2, and a fourth fastener half part 63 on the back surface cover 42, which is stored in the recess 6 so as to be detachably connected to the third fastener half part 61. The recess 6 with predetermined depth is famed along the boundary between a main cushion part 10 and a side cushion part 11.

Likewise the pulling-over part A1, the pulling-over part A3 of the seat back SB includes the recess 6 extending in the transverse direction of the cushion member 2. Each of the pulling-over parts A4 to A6 of the seat cushion SC has the similar structure to that of the respective pulling-over parts A1 to A3.

The cushion member 2 of the seat back SB includes the main cushion part 10 for supporting the occupant's back from behind, and the side cushion part 11 for holding the occupant's back from the side.

The back surface cover 42 is constituted by a main surface part 20 applied to the main cushion part 10 of the cushion member 2, and a side surface part 21 applied to the side cushion part 11. The main surface part 20 and the side surface part 21 of the skin 3 are connected with a sewing part 24. The back surface cover 42 and the back peripheral cover 52 are connected on an outer side surface 11a of the side cushion part 11 with a first fastening part 30.

The detachable first fastening part 30 includes a first fastener half part 31 disposed while extending along the peripheral edge of the back surface cover 42, and a second fastener half part 32 disposed while extending along the peripheral edge of the back peripheral cover 52 so as to be detachably connected to the first fastener half part 31. The first fastening part 30 formed as a zipper connects the back surface cover 42 to the back peripheral cover 52 by bringing teeth 31a called element of the first fastener half part 31 in mesh with teeth 32a called element of the second fastener half part 32. The first fastening part 30 is formed on left, right, and upper surfaces of the back surface cover 42 and the back peripheral cover 52, and left, right, and front surfaces of the cushion surface cover 41 and the cushion peripheral cover 51. The first fastening part is not formed on the lower surface of the back surface cover 42 and the back peripheral cover 52, and the rear surface of the cushion surface cover 41 and the cushion peripheral cover 51.

Figure 2:
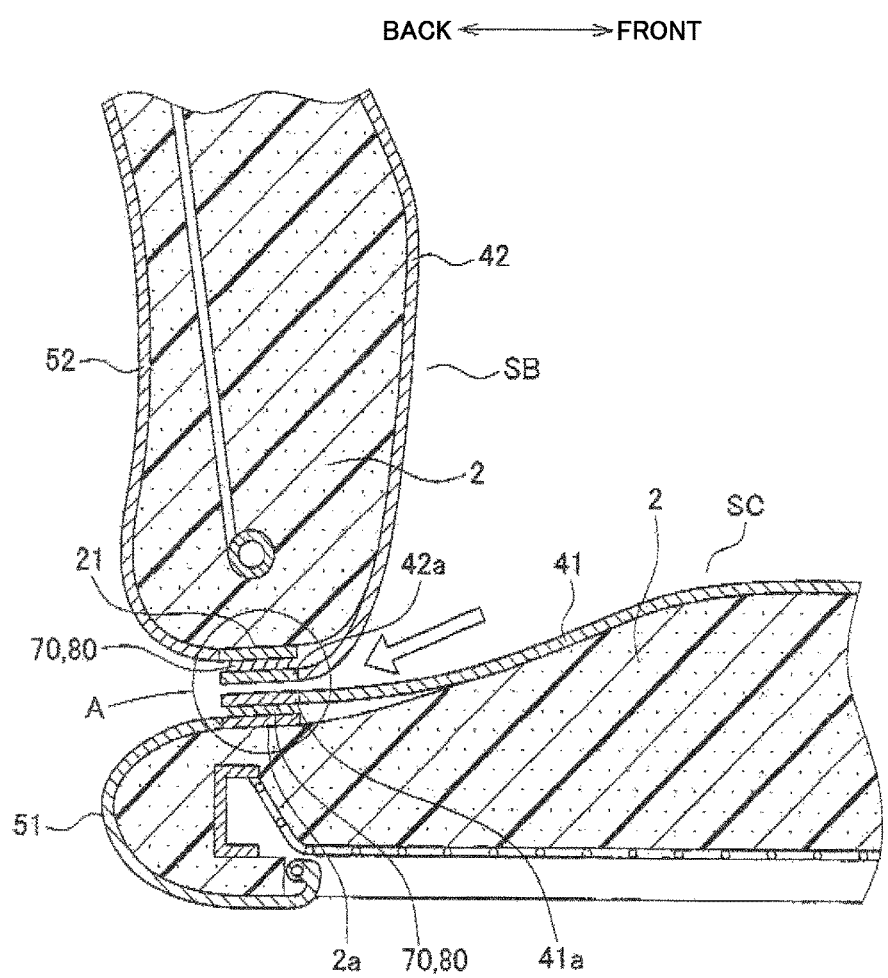
FIG. 2 is a sectional view taken along line II-II of FIG. 1.
Figure 3:
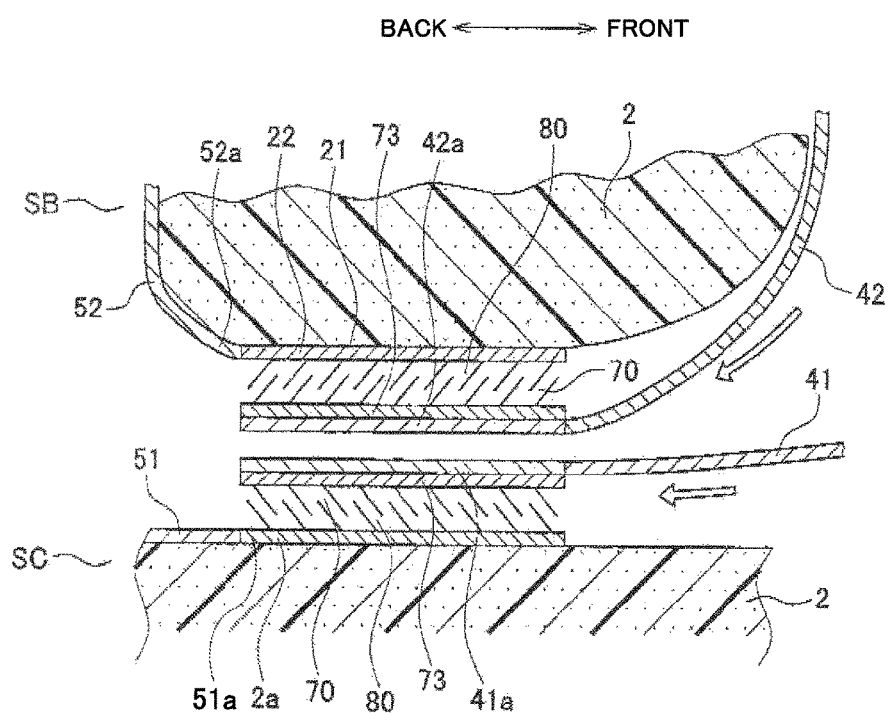
FIG. 3 is an enlarged view of a part A as shown in FIG. 2.
Figure 4:
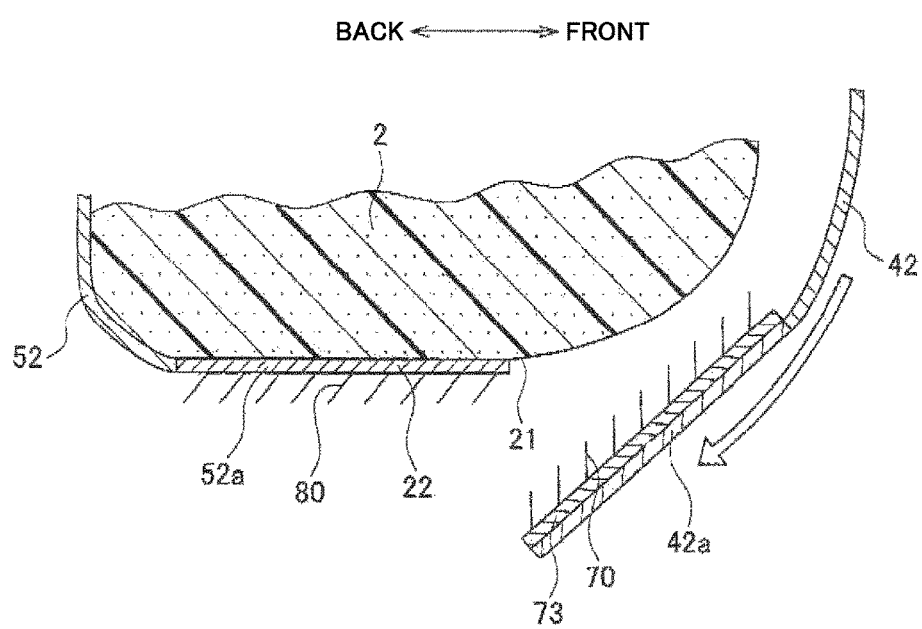
FIG. 4 is a sectional view of a seat back as shown in FIG. 2.
Figure 5:
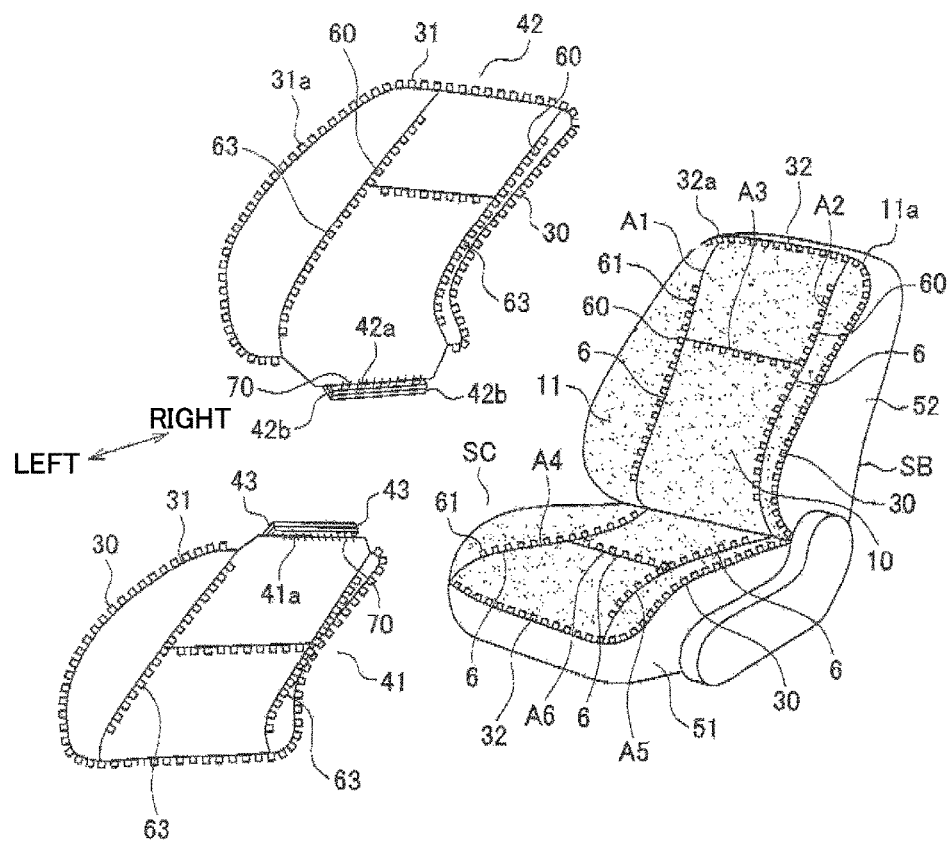
FIG. 5 is an exploded perspective view of the seat.

A first inclined pile 70 and a second inclined pile 80 are respectively disposed on a lower end 42a of the back surface cover 42 and a lower surface 21 of the cushion member 2 of the seat back SB while facing with each other as shown in FIGS. 2 and 3. The first inclined pile 70 and the second inclined pile 80 may be made of the soft linear synthetic resin, for example, plastics, or the raised fabric.

The first inclined pile 70 of the back surface cover 42 is disposed on the lower end 42a of the back surface cover 42 along the left-to-right direction while being forwardly inclined. The first inclined pile 70 may be directly connected to the lower end 42a of the back surface cover 42. Alternatively, the first inclined pile 70 may be connected to a holding piece 73 made of plastic plate. The holding piece 73 may be sewn to the lower end 42a of the back surface cover 42 for connection.

The first inclined pile 70 is disposed on the lower end 42a of the back surface cover 42. Inclined parts 42b which are inclined toward the center are disposed at both ends of the lower end 42a of the back surface cover 42, which allow the lower end 42a of the back surface cover 42 to be easily inserted between the seat back SB and the seat cushion SC.

The second inclined pile 80 is disposed on the lower surface 21 of the cushion member 2 of the seat back SB, and an end 52a of the back peripheral cover 52. The backwardly inclined second inclined pile 80 may be connected to a base plate 22 fixed to the end 52a of the back peripheral cover 52.

The second fastening parts 60 and the first fastening parts 30 of the pulling-over parts A1 to A3 are fastened for connecting the back surface cover 42. Insertion of the lower end 42a of the back surface cover 42 between the seat cushion SC and the seat back SB brings the first inclined pile 70 of the back surface cover 42 into engagement with the second inclined pile 80 of the back peripheral cover 52 since the first inclined pile 70 and the second inclined pile 80 are disposed on the lower end 42a of the back surface cover 42 and the lower surface 21 of the cushion member 2 of the seat back SB, respectively while facing with each other. The first inclined pile 70 of the back surface cover 42 is forwardly inclined, and the second inclined pile 80 of the back peripheral cover 52 is backwardly inclined for easy insertion.

Once being inserted, the first inclined pile 70 of the back surface cover 42 is kept engaged with the backwardly inclined second inclined pile 80 of the back peripheral cover 52 in spite of the load in the forward direction applied to the back surface cover 42. This ensures to connect the lower end 42a of the back surface cover 42 to the end 52a of the back peripheral cover 52 without causing disengagement.

As the seat cushion SC has substantially the same structure as that of the seat back SB, only the essential structure of the seat cushion SC will be described hereinafter.

The first inclined pile 70 and the second inclined pile 80 are respectively disposed on a rear end 41a of the cushion surface cover 41 and a rear end surface 2a of the cushion member 2 of the seat cushion SC while facing with each other.

The first inclined pile 70 of the cushion surface cover 41 is disposed on the rear end 41a of the cushion surface cover 41 in the left-to-right direction, and forwardly inclined. The first inclined pile 70 may be directly connected to the rear end 41a of the cushion surface cover 41. Alternatively, the first inclined pile 70 may be connected to the holding piece 73 made of plastic plate. The holding piece 73 may be sewn to the rear end 41a of the cushion surface cover 41 for connection.

The first inclined pile 70 is disposed on the rear end 41a of the cushion surface cover 41. Inclined parts 43 which are inclined toward the center are disposed at both ends of the rear end 41a of the cushion surface cover 41, which allow the rear end 41a of the cushion surface cover 41 to be easily inserted between the seat back SB and the seat cushion SC.

The second inclined pile 80 is disposed on the upper surface 22 of the cushion member 2 of the seat cushion SC, and an end 51a of the cushion peripheral cover 51. The backwardly inclined second inclined pile 80 is connected to the base plate 22 fixed to the end 51*a* of the cushion peripheral cover 51.

The second fastening parts 60 and the first fastening parts 30 of the pulling-over parts A4 to A6 are fastened for connecting the cushion surface cover 41. Insertion of the rear end 41*a* of the cushion surface cover 41 between the seat cushion SC and the seat back SB brings the first inclined pile 70 of the cushion surface cover 41 into engagement with the second inclined pile 80 of the cushion peripheral cover 51 since the first inclined pile 70 and the second inclined pile 80 are disposed on the rear end 41*a* of the cushion surface cover 41 and the rear end surface 2*a* of the cushion member 2 of the seat cushion SC, respectively while facing with each other. The first inclined pile 70 of the cushion surface cover 41 is forwardly inclined, and the second inclined pile 80 of the cushion peripheral cover 51 is backwardly inclined for easy insertion.

Once being inserted, the first inclined pile 70 of the cushion surface cover 41 is kept engaged with the second inclined pile 80 backwardly inclined on the cushion peripheral cover 51 in spite of the load in the forward direction applied to the cushion surface cover 41. This ensures to connect the rear end 41*a* of the cushion surface cover 41 to the end 51*a* of the cushion peripheral cover 51 without causing disengagement.

The holding piece 73 made of plastic plate is attached to the rear end 41*a* of the cushion surface cover 41 so as to be easily inserted together with the holding piece 73. The inclined parts 43 are formed at left and right sides of the rear end 41*a* of the cushion surface cover 41. This makes it possible to perform the insertion without hooking the left and right parts.

The seat according to the present invention is applicable to seats for automobile, airplane, train, bus, passenger ship and the like.

It is to be understood that the present invention is not limited to the above-described embodiment. For example, the first inclined pile and the second inclined pile are attached to the back surface side (cushion side) of the back surface cover 42, and the surface side (side of the back surface cover 42) of the cushion part of the seat back SB, respectively. Then the first inclined pile is arranged in the direction of the load applied by the seated occupant, and the second inclined pile is arranged in the direction opposite the direction of the load applied by the seated occupant so that those piles are brought into engagement. This makes it possible to suppress and further prevent slippage of the back surface cover 42. The slippage of the back surface cover 42 may be suppressed and further prevented at least by locating the first and the second inclined piles in the region around the pulling-over part A3. The first inclined pile and the second inclined pile are attached to the back surface side (cushion side) of the cushion surface cover 41, and the surface side (side of the cushion surface cover 41) of the cushion part of the seat cushion SC, respectively. Then the first inclined pile is arranged in the direction of the load applied by the seated occupant, and the second inclined pile is arranged in the direction opposite the direction of the load applied by the seated occupant so that those piles are brought into engagement. This makes it possible to suppress and further prevent slippage of the cushion surface cover 41. The slippage of the cushion surface cover 41 may be suppressed and further prevented at least by locating the first and the second inclined piles in the region around the pulling-over part A6.

LIST OF REFERENCE SIGNS

1: seat,
2: cushion member,
3: skin,
4: surface cover,
5: peripheral cover,
30: first fastening part,
31: first fastener half part,
32: second fastener half part,
60: second fastening part,
A1-A6: pulling-over part,
SB: seat back (seat section),
SC: seat cushion (seat section),
70: first inclined pile,
80: second inclined pile

The invention claimed is:

1. A seat having a back cushion and a seat cushion, at least one of the back cushion and the seat cushion having a surface cover and a peripheral cover connected via a detachable first fastening part, wherein a first inclined pile is disposed on the one cushion in a space between opposed surfaces of the back cushion and the seat cushion at a joint part of the seat, an end of the surface cover has a second inclined pile inserted into the space and engaged with the first inclined pile, the first inclined pile is inclined in an insertion direction of the end of the surface cover into the space, and the second inclined pile is inclined in a direction opposite to the insertion direction.

2. The seat according to claim 1,
wherein the seat cushion has the surface cover and the peripheral cover;
the surface cover and the peripheral cover are detachably connected on left, right, and front surfaces of the seat cushion via the first fastening part; and
the first and second inclined piles are engageably disposed on the seat cushion and a rear end of the surface cover, respectively.

3. The seat according to claim 1,
wherein the back cushion has the surface cover and the peripheral cover;
the surface cover and the peripheral cover are detachably connected on left, right, and upper surfaces of the seat back via the first fastening part; and
the first and second inclined piles are engageably disposed on the back cushion and a lower end of the surface cover, respectively.

4. The seat according to claim 1,
wherein a holding piece is attached to the end of the surface cover; and
the second inclined pile is formed on the holding piece.

* * * * *